United States Patent
Hibino et al.

(10) Patent No.: US 8,753,242 B2
(45) Date of Patent: Jun. 17, 2014

(54) VEHICULAR POWER TRANSMITTING SYSTEM

(75) Inventors: Akira Hibino, Toyota (JP); Michitaka Tsuchida, Nishikamo-gun (JP); Hiromichi Kimura, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/809,806

(22) PCT Filed: Jul. 13, 2010

(86) PCT No.: PCT/JP2010/061847
§ 371 (c)(1),
(2), (4) Date: Jan. 11, 2013

(87) PCT Pub. No.: WO2012/008020
PCT Pub. Date: Jan. 19, 2012

(65) Prior Publication Data
US 2013/0116086 A1    May 9, 2013

(51) Int. Cl.
*F16H 3/72*   (2006.01)
(52) U.S. Cl.
USPC .......................................................... 475/5
(58) Field of Classification Search
None
See application file for complete search history.

(56) References Cited

U.S. PATENT DOCUMENTS

2010/0203995 A1 *  8/2010  Zhang et al. .................... 475/5

FOREIGN PATENT DOCUMENTS

| JP | 2004-019834 A | 1/2004 |
| JP | 2004-225871 A | 8/2004 |
| JP | 2008-064281 A | 3/2008 |
| JP | 2010-143363 A | 7/2010 |
| JP | 2010-254230 A | 11/2010 |

* cited by examiner

*Primary Examiner* — Dirk Wright
(74) *Attorney, Agent, or Firm* — Kenyon & Kenyon LLP (57) ABSTRACT

Providing a vehicular power transmitting system which includes a torque limiter device and which is configured to reduce deterioration of durability of a rotary member disposed between an engine and the torque limiter device. An inertia moment of a first rotary portion of a torque limiter device about its axis (first axis RC1) is smaller than an inertia moment of a second rotary portion about its axis (first axis RC1), so that an inertia moment of rotary members between an input shaft and the first rotary portion can be reduced as compared with that where the above-indicated inertia moment is larger than the inertia moment. Accordingly, the torque which transiently acts on a rotary member disposed between the engine and the torque limiter device, for instance, acts on the input shaft, during an operation of the torque limiter device, that is, during a slipping motion of the first rotary portion and the second rotary portion can be reduced, so that the deterioration of durability of the input shaft can be reduced.

15 Claims, 4 Drawing Sheets

|  | INERTIA MOMENT RATIO OF TORQUE LIMITER (SUN GEAR SIDE : ELECTRIC MOTOR SIDE) |
|---|---|
| COMPARATIVE EXAMPLE | 2:1 |
| EMBODIMENT OF THE INVENTION | 1:2 |

VEHICULAR POWER TRANSMITTING SYSTEM

This is a 371 national phase application of PCT/JP2010/061847 filed 13 Jul. 2010, the contents of which are incorporated herein by reference.

TECHNICAL FIELD

The present invention relates to a vehicular power transmitting system connected to an engine, and more particularly to a torque limiter device provided in the vehicular power transmitting system.

BACKGROUND ART

There is well known a vehicular power transmitting system wherein an electric motor is connected through a torque limiter device to a power transmitting path between an engine and drive wheels. Patent Document 1 discloses a power distributing apparatus as an example of such a power transmitting system. This power transmitting system is provided with a planetary gear set constituting a part of the above-indicated power transmitting path, and a friction clutch serving as the above-described torque limiter device, which is operable to transmit a torque within a predetermined permissible range and which is disposed between a planetary gear (carrier) of the above-described planetary gear set and the above-described electric motor.

PRIOR ART DOCUMENTS

Patent Documents

Patent Document 1: JP-2008-064281A
Patent Document 2: JP-2004-019834A

SUMMARY OF THE INVENTION

Object Achieved by the Invention

By the way, the torque limiter device described above is configured to limit the torque to be transmitted from the engine, according to the above-indicated permissible range, thereby functioning to prevent transmission of an excessively large torque to a rotary member constituting a part of the above-described power transmitting path, for instance. This rotary member to which the torque is transmitted from the engine has an inertia moment determined by its mass and geometry. Therefore, when the engine torque exceeds the upper limit of the above-indicated permissible range, for example, the torque limiter device (friction clutch) operates (slips) to cut off the torque transmission, but the torque transmission to the rotary member disposed between the engine and the torque limiter device is not cut off at the time of operation of the torque limiter device, that is, a torque (load) is transiently applied to the rotary member, depending upon the inertia moment of a portion of the power transmitting path which includes the rotary member and at the downstream end of which the torque transmission is cut off. For the torque limiter device to adequately protect the rotary member disposed between the above-described engine and the torque limiter device, this torque limiter device must be configured, with an influence of the above-indicated inertia moment being taken into consideration. However, the inertia moment is not taken into consideration at all with respect to a drive force distributing device disclosed in the above-identified Patent Document 1, giving rise to a risk that the load acting on the above-described rotary member in the form of an input shaft of the vehicular power transmitting system, for example, increases to a value as high as to cause deterioration of the durability of the rotary member. It should be noted that this problem has not been addressed yet.

The present invention was made in view of the background art described above. It is therefore an object of the present invention to provide a vehicular power transmitting system which includes a torque limiter device and which is configured to reduce deterioration of durability of a rotary member disposed between an engine and the torque limiter device.

Means for Achieving the Object

The object indicated above is achieved according to the first aspect of the present invention, which provides (a) a vehicular power transmitting system comprising an input shaft connected to an engine, an electric motor connected to a power transmitting path between the above-described input shaft and drive wheels, a first rotary portion disposed on the side of the above-described engine, and a second rotary portion disposed on the side of the above-described electric motor, such that the input shaft, the electric motor, the first rotary portion and the second rotary portion are rotatable relative to each other about a predetermined axis of rotation, the first rotary portion and the second rotary portion providing a torque limiter device configured to limit a transmitting torque to be transmitted between the first and second rotary portions, to a predetermined upper limit, by a slipping motion between the first and second rotary portions, (b) characterized in that an inertia moment of the above-described first rotary portion about the above-described predetermined axis of rotation is smaller than an inertia moment of the above-described second rotary portion about the predetermined axis of rotation.

Advantages of the Invention

According to the present invention, the inertia moment of rotary members between the above-described input shaft and the above-described first rotary portion can be reduced as compared with that where the inertia moment of the above-described, first rotary portion is larger than the inertia moment of the above-described second rotary portion. Accordingly, the torque (load) which transiently (temporarily) acts on the rotary member disposed between the engine and the torque limiter device, for instance, acts on the input shaft, during an operation of the torque limiter device, that is, during the slipping motion between the above-described first rotary portion and the above-described second rotary portion, can be reduced, so that the deterioration of durability of the above-described input shaft can be reduced. It is to be understood that although the above-described first rotary portion is disposed on the side of the engine while the above-described second rotary portion is disposed on the side of the electric motor in the torque limiter device, as seen along the power transmitting path between the engine and the electric motor, the expressions "disposed on the side of the engine" and "disposed on the side of the electric motor" do not mean the positional arrangement in a space between the first and second rotary members.

Preferably, a total engine-side inertia moment which is a sum of inertia moments of rotary members about their axis of rotation in the power transmitting path from the above-described input shaft to the above-described first rotary portion is smaller than a total electric-motor-side inertia moment which is a sum of inertia moments of rotary members about their axis of rotation in a power transmitting path from the above-described electric motor to the above-described second rotary portion. While the load temporarily acting on the above-described input shaft during the operation (slipping motion) of the above-described torque limiter device increases with an increase of the above-indicated total engine-side inertia moment, the load temporarily acting on the above-described input shaft during the operation of the above-described torque limiter device can be reduced, and the deterioration of durability of the above-described input shaft can be reduced, in the present vehicular power transmitting system, as compared with those in a vehicular power transmitting system wherein the torque limiter device was configured for example such that the above-indicated, total engine-side inertia moment is larger than the above-indicated total electric-motor-side inertia moment.

According to the third aspect of the invention, there is provided (a) a vehicular power transmitting system comprising an input shaft connected to an engine, an electric motor connected to a power transmitting path between the above-described input shaft and drive wheels, a first rotary portion disposed on the side of the above-described engine, and a second rotary portion disposed on the side of the above-described electric motor, such that the input shaft, the electric motor, the first rotary portion and the second rotary portion are rotatable relative to each other about a predetermined axis of rotation, the first rotary portion and the second rotary portion providing a torque limiter device configured to limit a transmitting torque to be transmitted between the first and second rotary portions, to a predetermined upper limit, by a slipping motion between the first and second rotary portions, (b) characterized in that a total engine-side inertia moment which is a sum of inertia moments of rotary members about their axis of rotation in the power transmitting path from the above-described input shaft to the above-described first rotary portion is smaller than a total electric-motor-side inertia moment which is a sum of inertia moments of rotary members about their axis of rotation in a power transmitting path from the above-described electric motor to the above-described second rotary portion. In the present vehicular transmitting system constructed as described above, the load temporarily acting on the above-described input shaft during the operation of the above-described torque limiter device can be reduced, as compared with that in a vehicular power transmitting system wherein the torque limiter device was configured for example such that the above-indicated total engine-side inertia moment is larger than the above-indicated total electric-motor-side inertia moment. Accordingly, the deterioration of durability of the above-described input shaft can be reduced.

In each of the first and third aspects of the inventions, as described above, a part of the power transmitting path between the above-described input shaft and the above-described drive wheels is constituted by a planetary gear set which includes a sun gear connected to the above-described electric motor through the above-described torque limiter device, a ring gear connected to the above-described drive wheels, and a carrier which is connected to the above-described input shaft and which supports a pinion gear interposed between the sun gear and the ring gear, such that the pinion gear is rotatable about its axis and an axis of the planetary gear set. Accordingly, the engine torque is reduced according to the gear ratio of the above-described planetary gear set before the engine torque is transmitted to the torque limiter device, so that the size of the torque limiter device can be reduced, as compared with that where the torque limiter device was disposed between the above-described planetary gear set and the engine, for example, between the above-described input shaft and the engine. In the torque limiter device disposed between the above-described electric motor and the above-described sun gear, the above-described first rotary portion is connected to the above-described sun gear, while the above-described second rotary member is connected to the above-described electric motor. It is further noted that an influence of the inertia moment of the first rotary portion on the input shaft during the operation of the torque limiter device is larger where the planetary gear set is interposed between the input shaft and the first rotary portion, as compared with that where the planetary gear set is not interposed therebetween, so that the above-described advantage obtained by the arrangement that the inertia moment of the first rotary portion is smaller than the inertia moment of the second rotary portion, namely, the advantage that the load transiently acting on the input shaft during the operation of the torque limiter device can be reduced, can be enjoyed more effectively. In particular, the advantage of reduction of the load is significant in the presence of the pulsation of the load (torque) which transiently acts on the above-described input shaft during the operation of the torque limiter device.

Preferably; the above-described torque limiter device is disposed within a housing in which the above-described planetary gear set is accommodated, and is lubricated with a lubricant which lubricates the planetary gear set. In this case, it is possible to more stably prevent an entry of foreign matters into the torque limiter device, than where the above-described torque limiter device was disposed outside the above-described housing, and to reduce deterioration and rusting of the portions of the torque limiter device which slip on each other during the operation or the like. Accordingly, the mechanical reliability of the torque limiter device can be increased.

Preferably, the above-described first rotary portion includes a friction plate, while the above-described second rotary portion includes a presser member frictionally contacting the friction plate, and a pressing mechanism configured to press the presser member against the friction plate. In this case, a torque limiter device generally used for a vehicle can be used in the above-described vehicular power transmitting system.

Preferably; (a) the above-described first rotary portion includes a friction plate, while the above-described second rotary portion includes a presser member frictionally contacting the above-described friction plate, and a pressing mechanism configured to press the above-described presser member against the above-described friction plate, and (h) the presser member is disposed radially outwardly of the above-described pinion gear regarding a center axis of the above-described planetary gear set. In this case, the above-described presser member, and the above-described pinion gear or a member by which the pinion gear is supported. On the above-described, carrier, can be disposed so as to overlap each other in the axial direction of the above-described planetary gear set, so that the length in the above-described axial direction over which the planetary gear set and the torque limiter device are disposed can be reduced as compared with that where the above-described presser member was not disposed radially outwardly of the pinion gear.

Preferably, a damper is interposed between the above-described engine and the above-described input shaft, to transmit a torque from one of the engine and the input shaft to the other, and to absorb a pulsation of the torque. In this case, it is possible to reduce transmission of the pulsation of the engine torque to the above-described vehicular power transmitting system. It is also possible to reduce transmission of a temporary load due to an inertia moment of the engine, to the above-described, input shaft during the operation of the torque limiter device.

While the first aspect of above-described invention and the third aspect of the above-described invention have been described as mutually independent inventions, these two inventions have a common specific technical feature that the above-described torque limiter device has a small inertia moment that causes a load acting on the above-described input shaft during an operation of the torque limiter device. Thus, the two inventions relate to each other so as to form a single general inventive concept.

MODE FOR CARRYING OUT THE INVENTION

Figure 1:
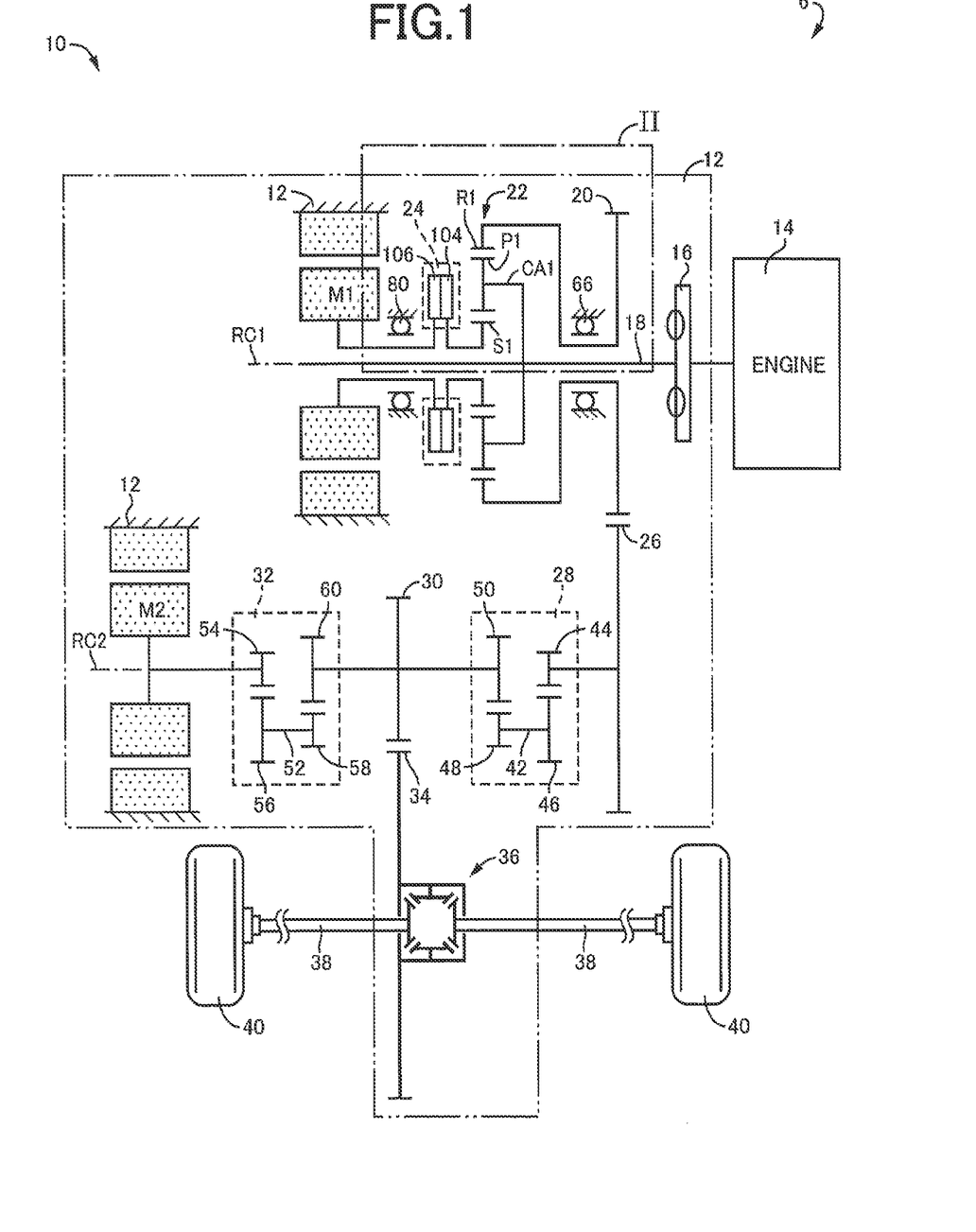
FIG. 1 is a schematic view for explaining a vehicular power transmitting system according to a first embodiment of the present invention.
Figure 2:
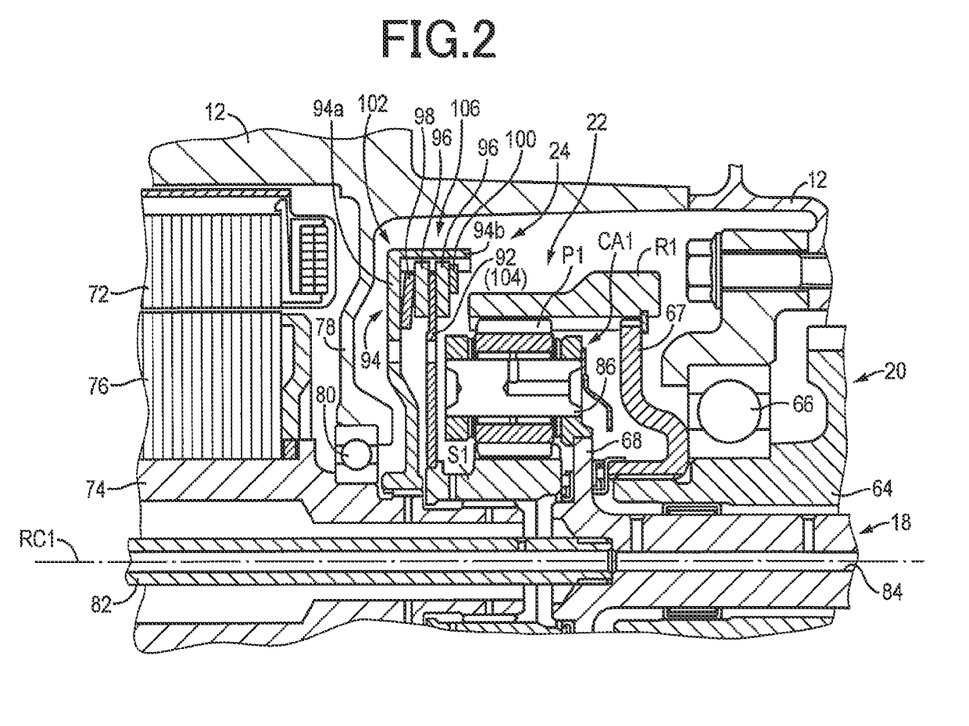
FIG. 2 is a cross sectional view showing a major portion of the vehicular power transmitting system of FIG. 1, that is, an area in FIG. 1 corresponding to a portion II (indicated by a one-dot chain line) of the system which includes a torque limiter device.

Embodiments of the present invention will be described in detail by reference to the drawings, First Embodiment FIG. 1 is the schematic view for explaining a vehicular power transmitting system 10 (hereinafter referred to as "power transmitting system 10") according to the present invention, and FIG. 2 is the cross sectional view showing a major portion of the power transmitting system 10, that is, an area in FIG. 1 corresponding to a portion II (indicated by a one-dot chain line) of the system 10 which includes a torque limiter device 24. As shown in FIG. 1, the power transmitting system 10 is a transaxle interposed between an engine 14 which is an internal combustion engine such as a gasoline engine or a diesel engine, and drive wheels 40, and is configured to transmit a drive force of the engine 14 to the drive wheels 40. The power transmitting system 10 has a transaxle (T/A) casing 12 (hereinafter referred to as "casing 12") as a non-rotatable member, and is provided with: a damper 16 operatively connected to an output shaft (crankshaft, for example) of the engine 14; an input shaft 18 connected to the engine 14 through the damper 16 and rotated by the engine 14; an output rotary member in the form of a first driving gear 20 mounted on the input shaft 18 rotatably relative to the input shaft 18; a planetary gear set 22 functioning as a power distributing mechanism; a torque limiter device 24; and a first electric motor M1. These elements 16, 18, 20, 22, 24 and M1 are disposed within the casing 12, coaxially with a first axis RC1 in the order of description in a direction away from the engine 14. The power transmitting system 10 is further provided with: a first driven gear 26 meshing with the above-indicated first driving gear 20; a first counter gear device 28; a second driving gear (differential driving gear) 30 connected to the first driven gear 26 through the first counter gear device 28; a second counter gear device 32; and a second electric motor M2 connected to the second driving gear 30 through the second counter gear device 32. These elements 26, 28, 30, 32 and M2 are disposed within the casing 12, coaxially with a second axis RC2 parallel to the first axis RC1. The power transmitting system 10 is further provided with a differential gear device (final speed reduction device) 36 having a second driven gear (differential driven gear) 34 meshing with the second driving gear 30.

The present power transmitting system 10 is preferably installed transversely in a front part of a vehicle 6 of a front-drive type, namely of an FF (front-engine front-drive) type, to drive the drive wheels 40. In the power transmitting system 10, the drive force of the engine 14 is transmitted to the pair of drive wheels 40 successively through the damper 16, input shaft 18, planetary gear set 22, first driving gear 20, first driven gear 26, first counter gear device 28, second driving gear 30, differential gear device 36 and a pair of axles 38.

The damper 16 is of a type to be used on an ordinary vehicle, and is interposed between the engine 14 and the input shaft 18, to transmit a torque from one of the engine 14 and the input shaft 18 to the other, and to absorb a pulsation due to variation of the torque received from the engine 14, for instance.

The first counter gear device 28 is provided with: a first auxiliary shaft 42 parallel to the second axis RC2; a first gear 44 connected coaxially to the first driven gear 26; a second gear 46 meshing with the first gear 44 and connected to the first auxiliary shaft 42; a third gear 48 connected to the first auxiliary shaft 42 and rotated together with the second gear 46; and a fourth gear 50 meshing with the third gear 48 and coaxially connected to the second driving gear 30. The first counter gear device 28 thus constructed functions to decelerate a rotary motion received from the first driven gear 26 and transmit the decelerated rotary motion to the second driving gear 30.

The second counter gear device 32 is provided with: a second auxiliary shaft 52 parallel to the second axis RC2; a fifth gear 54 connected coaxially to the second electric motor M2; a sixth gear 56 meshing with the fifth gear 54 and connected to the second auxiliary shaft 52; a seventh gear 58 connected to the second auxiliary shaft 52 and rotated together with the sixth gear 56; and an eighth gear 60 meshing with the seventh gear 58 and coaxially connected to the second driving gear 30. The second counter gear device 32 thus constructed functions to decelerate a rotary motion received from the second electric motor M2 and transmit the decelerated rotary motion to the second driving gear 30.

As shown in FIGS. 1 and 2, the first driving gear 20 has a cylindrical shaft portion 64 and is supported by the casing 12 through a ball bearing (radial bearing) 66, such that the first driving gear 20 is rotatable about the first axis RC1 and is axially immovable along the first axis RC1. A disc-like power transmitting member 67 is fixedly fitted on an axial part of the above-indicated shaft portion 64, which part is disposed on the side of the planetary gear device 22.

The input shaft 18 extends through the shaft portion 64 of the first driving gear 20 such that the input shaft 18 is rotatable about the first axis RC1 and axially immovable along the first axis RC1, relative to the casing 12. The input shaft 18 is connected at its one end to the engine 14 through the damper 16, and is thus rotated by the engine 14. The input shaft 18 has a flange portion 68 radially outwardly extending from the other end and connected at its radially outer end to a carrier CA1 of the planetary gear set 22 such that the carrier CA1 is rotated together with the flange portion 68. The thus constructed input shaft 18 functions to transmit the drive force from the engine 14 to the carrier CA1.

As described in FIG. 2, the first electric motor M1, which corresponds to an electric motor provided according to the present invention, is provided with: an electric motor stator 72 bolted or otherwise fixed to an, inner circumferential surface of the casing 12; an electric motor output shaft 74 disposed radially inwardly of the electric motor stator 72 rotatably about the first axis RC1 relative to the electric motor stator 72; and an electric motor rotor 76 disposed radially inwardly of the electric motor stator 72 and fixed to the outer circumferential portion of the electric motor output shaft 74. The electric motor output shaft 74 is supported by a disc-like partition wall 78 extending radially inwardly from the inner circumferential surface of the casing 12, through a ball bearing (radial bearing) 80 such that the electric motor output shaft 74 is rotatable about the first axis RC1 and is axially immovable along the first axis RC1. The electric motor output shaft 74 has a hollow structure in which a cylindrical oil pipe 82 is disposed such that the oil pipe 82 is connected at one of its opposite ends to the input shaft 18, and at the other end to an oil pump, so that a lubricant delivered from the oil pump is supplied to lubricating points within the casing 12, through the oil pipe 82 and an oil passage 84 formed through the input shaft 18.

Each of the first electric motor M1 and the second electric motor M2 provided in the present embodiment is a so-called motor/generator having also a function of an electric generator. The first electric motor M1 has at least the function of the electric generator capable of generating a reaction force, while the second electric motor M2 has at least a function of an electric motor capable of generating a chive force for driving the vehicle 6. Further, the first and second electric motors M1, M2 are configured to supply and receive an electric energy to and from each other, and the vehicle 6 is provided with an electric-energy storage device to supply and receive an electric energy to and from the first and second electric motors M1. M2.

The planetary gear set 22 is a single-pinion type planetary gear device which constitutes a part of a power transmitting path between the engine 14 and the drive wheels 40 and which functions as a differential mechanism. Described more specifically, the planetary gear set 22 has rotary elements (elements) in the form of a sun gear S1, a ring gear R1, a pinion gear P1 interposed between and meshing with the sun gear S1 and the ring gear R1, and a carrier CA1 supporting the pinion gear P1 such that the pinion gear P1 is rotatable about its axis and about the axis of the planetary gear set 22. The sun gear S1, carrier CA1 and ring gear R1 are supported axially immovably along the first axis RC1 and rotatably about the first axis RC1. The first rotary element in the form of the carrier CA1 is connected to the input shaft 18 and rotated together with the input shaft 18, and has a pinion shaft 86 extending coaxially through the pinion gear P1 so that the pinion shaft 86 supports the pinion gear P1 rotatably about its axis. The second rotary element in the form of the sun gear S1 is connected to the electric motor output shaft 74 of the first electric motor M1 through the torque limiter device 24, and is rotated together with the electric motor output shaft 74 as long as the torque limiter device 24 is placed in a non-slipping state. The third rotary element in the form of the ring gear R1 is fixed to a radially outer portion of the power transmitting member 67 so that the third rotary element is rotated together with the power transmitting member 67 and the first driving gear 20. Namely, the ring gear R1 is operatively connected to the drive wheels 40 through the power transmitting member 67 and the first driving gear 20. The planetary gear set 22 has a gear ratio ρ which is equal to $Z_{S1}/Z_{R1}$, where $Z_{S1}$ represents the number of teeth of the sun gear S1, while $Z_{R1}$ represents the number of teeth of the ring gear R1.

The planetary gear set 22 constructed as described above is a power distributing mechanism operable to mechanically distribute an output of the engine 14 received through the input shaft 18, to the first electric motor M1 and the first driving gear 20. That is, the output of the engine 14 is distributed to the first electric motor M1 and the first driving gear 20, so that the first electric motor M1 is operated as an electric generator with a portion of the output of the engine 14 distributed to the first electric motor M1. An electric energy generated by the first electric motor M1 is stored or used to operate the second electric motor M2. Therefore, the power transmitting system 10 is operable as an electrically controlled continuously variable transmission capable of continuously changing a rotating speed of the first driving gear 20 irrespective of a certain operating speed of the engine 14, while a differential state of the planetary gear set 22 placed in its continuously variable shifting state (electric CVT state), for example, is controlled by the first electric motor M1. When the first electric motor M1 controls the differential state of the planetary gear set 22 as described above, the first electric motor M1 generates a reaction torque $T_R$ corresponding to an engine torque Te so that the output (drive force) of the engine 14 is transmitted to the first driving gear 20, that is, to the drive wheels 40 connected to the first driving gear 20. When the reaction torque $T_R$, that is, the torque (load) acting on the sun gear S1 is zeroed, or substantially zeroed by the differential operation of the planetary gear set 22, the torque transmission from the engine 14 to the drive wheels 40 is cut off. Namely, the torque to be transmitted from the engine 14 to the drive wheels 40 can be adjusted by adjusting the load acting on the sun gear S1.

As shown in FIG. 2, the torque limiter device 24 is provided with: a friction plate member 92 in the form of an annular disc friction plate; a covering member 94 including a wall portion 94a in the form of an annular disc located on one of opposite sides of the friction plate member 92 nearer to the first electric motor M1, and a cylindrical portion 94b projecting from a radially outer end of the wall portion 94a toward the friction plate member 92; a pair of presser members 96 in the form of annular discs disposed coaxially with the first axis RC1, within the cylindrical portion 94b and on respective opposite sides of a radially outer portion of the friction plate member 92; a coned-disc spring 98 disposed between the wall portion 94a and the presser member 96 on the side of the wall portion 94a, in abutting contact on its opposite surfaces with the wall portion 94a and the presser member 96, respectively; and a retainer ring 100 disposed coaxially with the first axis RC1 on one of opposite sides of the pair of presser members 96 remote from the coned-disc spring 98, and axially immovably relative to the covering member 94 along the first axis RC1. The torque limiter device 24 is disposed within a housing in the form of the casing 12 which accommodates the planetary gear set 22, so that the friction plate member 92, presser members 96 and other components of the torque limiter device 24 are lubricated with the lubricant lubricating the planetary gear set 22 supplied through the oil pipe 82. Namely, the torque limiter device 24 is of a wet type lubricated with the lubricant as described above.

The friction plate member 92, which corresponds to a friction plate provided according to the present invention, is connected, for instance, splined at its radially inner portion to one of opposite axial ends of a radially outer portion of the sun gear S1, which one axial end is on the side of the first electric motor M1, such that the friction plate member 92 is rotated together with the sun gear S1 about the first axis RC1. The friction plate member 92 and the presser members 96, which frictionally contact with each other, have friction members having a predetermined friction coefficient, at least on their contacting surfaces.

The covering member 94 is connected, for instance, splined at radially inner portion of its wall portion 94a to a radially outer portion of the electric motor output shaft 74 such that the covering member 94 is rotated together with the electric motor output shaft 74 about the first axis RC1, while the pair of presser members 96 are connected, for instance, splined to a radially inner portion of the cylindrical portion 94b such that the presser member 96 are rotated together with the covering member 94 about the first axis RC1. The pair of presser members 96 are positioned so as to sandwich the friction plate member 92 therebetween in the direction of extension of the first axis RC1, and so as to be sandwiched by and between the coned-disc spring 98 and the retainer ring 100. Further, the pair of presser members 96 are disposed coaxially with the planetary gear set 22, and radially outwardly of the pinion gear P1 disposed coaxially with the first axis RC1, and the presser member 96 disposed on the side of the planetary gear set 22 is disposed so as to overlap an axial end portion of the carrier CA1 extending away from the pinion gear P1 in the direction of extension of the first axis RC1, and so as to prevent an interference with the planetary gear set 22.

The retainer ring 100 is held in engagement with a radially inner portion of the cylindrical portion 94b so as to prevent a movement of the presser member 96 disposed remote from the coned-disc spring 98, in the direction of extension of the first axis RC1 away from the coned-disc spring 98, while the coned-disc spring 98 forces the pair of presser members 96 and the friction plate member 92 in their radially outer portions in the direction of extension of the first axis RC1 toward the retainer ring 100. Namely, the covering member 94, coned-disc spring 98 and retainer ring 100 function to press the pair of presser members 96 against the friction plate member 92 under a biasing force of the coned-disc spring 98, and are therefore considered to constitute a pressing mechanism 102 for pressing the presser members 96 against the friction plate member 92.

The pressing mechanism 102 and the presser members 96 are rotatable relative to the friction plate member 92, in the absence of the biasing force of the coned-disc spring 98, and the friction plate member 92 and the sun gear S1 are rotated together as a unit, while the pressing mechanism 102 and the presser members 96 are rotated with the electric motor output shaft 74 as a unit. In this respect, the friction plate member 92 constitutes a first rotary portion 104 disposed on the side of the engine. While the pressing mechanism 102 and the presser members 96 constitutes a second rotary portion 106 disposed on the side of the first electric motor M1. It is noted that the first axis RC1 corresponds to predetermined axis of rotation of the first rotary portion 104 and the second rotary portion 106.

As described above, the first rotary portion 104 is constituted by the friction plate member 92, while the second rotary portion 106 is constituted by the covering member 94, the pair of presser members 96, the coned-disc spring 98 and the retainer ring 100. An inertia moment $I_1$ (unit: kg·m$^2$, for example) about the axis of rotation of the first rotary portion 104 is smaller than an inertia moment $I_2$ about the axis of rotation of the second rotary portion 106 ($I_1 < I_2$). As is apparent from FIG. 2, the above-indicated axis of rotation of the first rotary portion 104 and the above-indicated axis of rotation of the second rotary portion 106 are both coincident with the first axis RC1.

The torque limiter device 24 configured as described above limits a limiter transmitting torque $T_{LM}$ to be transmitted between the first and second rotary portions 104 and 106, to a predetermined upper limit T1, by a slipping motion between the first and second rotary portions 104, 106, namely, between the friction plate member 92 and the presser members 96. It is noted that a relationship between the above-indicated upper limit T1 and the biasing force (spring force) of the coned-disc spring 98 is obtained by experimentation, for instance, and that the biasing force of the coned-disc spring 98 is determined depending upon the desired upper limit T1 and according to the obtained relationship between the upper limit T1 and the biasing force of the coned-disc spring 98.

An operation of the torque limiter device 24 will be described more specifically. An engine torque Te is transmitted from the input shaft 18 to the torque limiter device 24 through the planetary gear set 22. At this time, the torque transmitted from the sun gear S1 to the torque limiter device 24 is smaller than the engine torque Te transmitted to the input shaft 18, according to the gear ratio ρ of the planetary gear set 22. When the torque transmitted from the sun gear S1 to the torque limiter device 24, that is, the limiter transmitting torque $T_{LM}$ exceeds the upper limit T1, the friction plate member 92 and the presser members 96 slip on each other, to thereby limit the limiter transmitting torque $T_{LM}$. As a result of limiting of the limiter transmitting torque $T_{LM}$ by the above-indicated slipping, the torque to be transmitted from the ring gear R1 toward the drive wheels 40, and the engine torque Te to be transmitted to the input shaft 18 are limited according to the limited limiter transmitting torque $T_{LM}$, owing to the differential function of the planetary gear set 22.

In the present embodiment, a total engine-side inertia moment $I_{T1}$ which is a sum of inertia moments of rotary members about their axis of rotation constituting a power transmitting path from the input shaft 18 to the first rotary portion 104 is smaller than a total electric-motor-side inertia moment $I_{T2}$ which is a sum of inertia moments of rotary members about their axis of rotation constituting a power transmitting path from the first electric motor M1 to the second rotary portion 106 (namely, $I_{T1} < I_{T2}$). In the specific example of FIG. 2, the rotary members constituting a power transmitting path from the input shaft 18 to the first rotary portion 104 include the input shaft 18, the carrier CA1, the pinion gear P1, the sun gear S1 and the first rotary portion 104, while the rotary members in the above-indicated power transmitting path from the first electric motor M1 to the second rotary portion 106 include the electric motor output shaft 74, the electric motor rotor 76 and the second rotating portion 106.

During an operation of the torque limiter device 24 in which the friction plate member 92 and the presser members 96 slip on each other, an input shaft torque Tin acting on the input shaft 18 has a pulsation. In view of this pulsation, the present embodiment wherein the inertia moment $I_1$ about the axis of rotation of the first rotary portion 104 on the side of the engine is smaller than the inertia moment $I_2$ about the axis of rotation of the second rotary portion 106 on the side of the first electric motor M1 as described above is arranged such that a maximum value of the input shaft torque Tin is made smaller than where a relationship between the inertia moments $I_1$ and $I_2$ is reversed with respect to that in the present embodiment. This arrangement will be explained by reference to FIG. 3, which is the time chart indicating the input shaft torque values Tin during operations of the torque limiter device of the power transmitting system 10 of this embodiment and a torque limiter device of a power transmitting system 10' according to a comparative example in which the relationship between the inertia moments $I_1$ and $I_2$ of the above-indicated first and second rotary portions is reversed with respect that in the present power transmitting system 10. Described more specifically regarding the relationships between the above-indicated inertia moments $I_1$ and $I_2$, a ratio ($I_1:I_2$) of the above-indicated inertia moments $I_1$ and $I_2$ in the present embodiment is 1:2, while that in the above-described comparative example is reversed with respect to that in the present embodiment, as indicated in FIG. 4.

Figure 5:
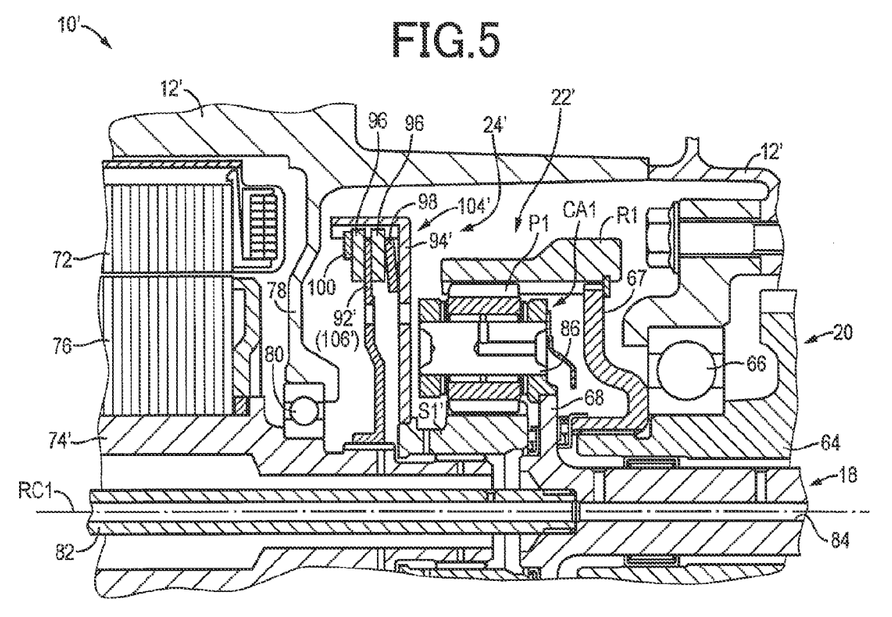
FIG. 5 is a cross sectional view showing an area of the above-indicated comparative example, which corresponds to the area shown in FIG. 2.

In the torque limiter device according to the above-described comparative example shown in FIG. 5, the positions of the friction plate member and the covering member in the direction of extension of the first axis RC1 are reversed with respect those in the present embodiment of FIG. 2. FIG. 5 is the cross sectional view showing an area of the above-indicated comparative example, which corresponds to the area shown in FIG. 2. Since the area shown in the cross sectional view of FIG. 5 is identical with that of FIG. 2, except for the torque limiter device 24' and its components, only a portion of the area shown in FIG. 5 different from that in FIG. 2 will be described. The comparative example of FIG. 5 is arranged such that the friction plate member 92' is connected to the electric motor output shaft 74' such that the friction plate member 92' and the electric motor output shaft 84' are rotated as a unit, while the covering member 94' is connected to the sun gear S1' such that the covering member 94' and the sun gear S1' are rotated as a unit, contrary to the arrangement shown in FIG. 2. Further, the components of the torque limiter device 24', more specifically, the friction plate member 92', covering member 94', presser members 96, coned-disc spring 98 and retainer ring 100 are arranged in the direction of extension of the first axis RC1 in the order reversed with respect to that in FIG. 2, and with orientation reversed with respect to that in FIG. 2. Accordingly, a space between the planetary gear set 22' and the partition wall 78 in which the torque limiter device 24' is accommodated within the casing 12' has a larger length in the direction of extension of the first axis RC1 in the above-indicated comparative example of FIG. 5 than in the present embodiment of FIG. 2. Further, the comparative example of FIG. 5 is different from the present embodiment of FIG. 2 regarding the mutual connection of the sun gear S1' and the covering member 94' and the mutual connection of the electric motor output shaft 74' and the friction plate member 92'. However, those differences do not influence the time chart of FIG. 3.

In the torque limiter device 24 according to the present embodiment shown in FIG. 2, the first rotary portion 104 is constituted by the friction plate member 92, while the second rotary portion 106 is constituted by the covering member 94, presser members 96, coned-disc spring 98 and retainer ring 100. In the torque limiter device 24' according to the comparative example shown in FIG. 5, on the other hand, the first rotary portion 104' on the engine side (on the sun gear side) is constituted by the covering member 94', presser members 96, coned-disc spring 98 and retainer ring 100, while the second rotary portion 106' on the side of the first electric motor M1 is constituted by the friction plate member 92'. In FIG. 5 showing the comparative example, reference sign 22' rather than 22 is used for the planetary gear set to identify the sun gear S1' which is connected to the covering member 94', contrary to the sun gear S1 shown in FIG. 2. It is also noted that the comparative example shown in FIG. 5 is not known.

Figure 3:
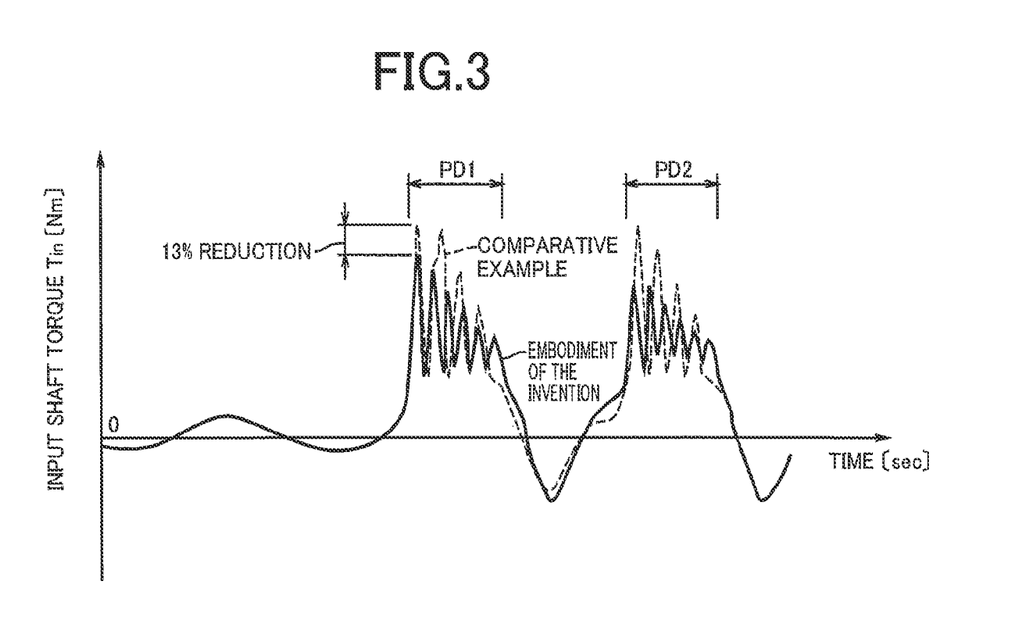
FIG. 3 is a time chart indicting input shaft torque values during operations of the torque limiter device of the vehicular power transmitting system of FIG. 1 and a torque limiter device of a vehicular power transmitting system according to a comparative example in which a relationship between inertia moments of first and second rotary portions is reversed with respect that in the vehicular power transmitting system of FIG. 1.
Figure 4:
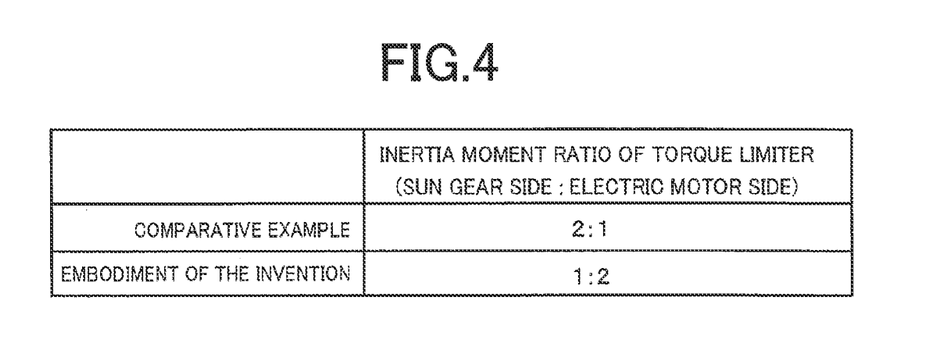
FIG. 4 is a table indicating the relationships between the inertia moments of the above-indicated first and second rotary portions in the vehicular power transmitting system of FIG. 1 and the vehicular power transmitting system according to the comparative example.

Referring back the time chart of FIG. 3, the input shaft torque Tin in the present embodiment is indicated by a solid line while that in the comparative example is indicated by a broken line. In both of the present embodiment and the comparative example, the engine torque Te which varies with the time is transmitted to the input shaft 18, and the input shaft torque Tin has a pulsation during an operation of the torque limiter device 24, 24' during time periods PD1 and PD2, as indicated in FIG. 3. The same upper. Emit T1 to which the limiter transmitting torque $T_{LM}$ is limited by the torque limiter device 24, 24' is set in both of the present embodiment and the comparative example. Comparison of the pulsating input shaft torques Tin during the time period PD1. In the present embodiment and the comparative example reveals about 13% reduction of the maximum value of the input shaft torque Tin in the present embodiment with respect to that in the comparative example. Thus, the present embodiment is considered to permit reduction of the load (torque) acting on the input shaft 18 with respect to the load, in the comparative example, without changing the above-indicated upper limit T1. In view of the fact that the only difference of the present embodiment with respect to the comparative example is that the inertia moment $I_1$ of the first rotary portion 104 about its axis is smaller than the inertia moment $I_2$ of the second rotary portion 106 about its axis, this difference ($I_1<I_2$) is considered to provide an effect of reducing the load (torque) acting on the above-indicated input shaft 18. It is also noted that a torque T to be generated by an inertia moment I of a given rotary element having an angular acceleration $\omega'$ is represented as $T=I\times\omega'$. In this respect, too, it will be understood that the reduction of the above-indicated inertia moment II has a relation with the effect of reducing the above-indicated load.

The present embodiment is configured such that the inertia moment $I_1$ of the first rotary portion 104 of the torque limiter device 24 about its axis (first axis RC1) is smaller than the inertia moment $I_2$ of the second rotary portion 106 about its axis (first axis RC1), so that the inertia moment of the rotary members between the input shaft 18 and the first rotary portion 104 can be reduced as compared with that where the above-indicated inertia moment $I_1$ is larger than the inertia moment $I_2$. Accordingly, the torque (load) which transiently (temporarily) acts on the rotary member disposed between the engine 14 and the torque limiter device 24, for instance, acts on the input shaft 18, during an operation of the torque limiter device 24, that is, during the slipping motion between the first rotary portion 104 and the second rotary portion 106, can be reduced, so that the deterioration of durability of the input shaft 18 can be reduced.

The present embodiment is further configured such that the total engine-side inertia moment $I_{T1}$ which is a sum of inertia moments of the rotary members about their axis of rotation in the power transmitting path from the input shaft 18 to the first rotary portion 104 is smaller than the total electric-motor-side inertia moment $I_{T2}$ which is a sum of inertia moments of the rotary members about their axis of rotation in the power transmitting path from the first electric motor M1 to the second rotary portion 106 ($I_{T1}<I_{T2}$). In this respect, it is noted that the load temporarily acting on the input shaft 18 during the operation (slipping motion) of the torque limiter device 24 increases with an increase of the total engine-side inertia moment $I_{T1}$. Accordingly, the load temporarily acting on the input shaft 18 during the operation of the torque limiter device 24 can be reduced, and the deterioration of durability of the input shaft 18 can be reduced in the present power transmitting system, as compared with those in a power transmitting system wherein the torque limiter device 24 was configured for example such that the total engine-side inertia moment $I_{T1}$ is larger than the total electric-motor-side inertia moment $I_{T2}$.

As shown in FIG. 1, the present embodiment is also configured such that a part of the power transmitting path between the input shaft 18 and the drive wheels 40 is constituted by the planetary gear set 22 which includes the sun gear S1 connected to the first electric motor M1 through the torque limiter device 24, the ring gear R1 connected to the drive wheels 40, and the carrier CA1 which is connected to the input shaft 18 and which supports the pinion gear P1 interposed between the sun gear S1 and the ring gear R1, such that the pinion gear P1 is rotatable about its axis and the axis of the planetary gear set 24. Accordingly, the engine torque Te is reduced according to the gear ratio ρ of the planetary gear set 22 before the engine torque Te is transmitted to the torque limiter device 24, so that the size of the torque limiter device 24 can be reduced, as compared with that where the torque limiter device 24 was disposed between the planetary gear set 22 and the engine 14, for example, between the input shaft 18 and the engine 14. It is further noted that an influence of the inertia moment $I_1$ of the first rotary portion 104 on the input shaft 18 during the operation of the torque limiter device 24 is larger where the planetary gear set 22 is interposed between the input shaft 18 and the first rotary portion 104, as compared with that where the planetary gear set 22 is not interposed therebetween, so that the above-described advantage obtained by the arrangement that the inertia moment $I_1$ of the first rotary portion 104 is smaller than the inertia moment $I_2$ of the second rotary portion 106, namely, the advantage that the load transiently acting on the input shaft 18 during the operation of the torque limiter device 24 can be reduced, can be enjoyed more effectively. In particular, the advantage of reduction of the load is significant in the presence of the pulsation of the load (torque) which transiently acts on the input shaft 18 during the operation of the torque limiter device 24, as shown in FIG. 3.

The present embodiment is further configured such that the torque limiter device 24 is disposed within the casing 12 in which the planetary gear set 22 is accommodated, and is lubricated with the lubricant which lubricates the planetary gear set 22. Accordingly, it is possible to more stably prevent an entry of foreign matters into the torque limiter device 24, than where the torque limiter device 24 was disposed outside the casing 12, and to reduce deterioration and rusting of the portions of the torque limiter device 24 which slip on each other during the operation. Accordingly, the mechanical reliability of the torque limiter device 24 can be increased. Further, it is not necessary to provide an extra or additional structure for lubricating the torque limiter device 24.

The present embodiment is also configured such that the first rotary portion 104 includes the friction plate member 92, while the second rotary portion 106 includes the pair of presser members 96 frictionally contacting the friction plate member 92, and the pressing mechanism 102 configured to press the presser members 96 against the friction plate member 92. Accordingly, a torque limiter device generally used for a vehicle can be used in the power transmitting system 10.

The present embodiment is also configured such that the pair of presser members 96 are disposed coaxially with the planetary gear set 22, namely, coaxially with the first axis RC1, and radially outwardly of the above-described pinion gear P1. In this case, the presser members 96 of the planetary gear set 22, and the pinion gear P1 or the member (pinion shaft 86) by which the pinion gear P1 is supported on the carrier CA1, can be disposed so as to overlap each other in the direction of extension of the first axis RC1, as shown in FIG. 2. Accordingly, the length in the direction of extension of the first axis RC1 over which the planetary gear set 22 and the torque limiter device 24 are disposed can be reduced as compared with that where the presser members 96 were not disposed radially outwardly of the pinion gear P1.

The present embodiment is further configured such that the power transmitting system 10 includes the damper 16 which is interposed between the engine 14 and the input shaft 18, to transmit the torque from one of the engine 14 and the input shaft 18 to the other, and to absorb the pulsation of the torque. Accordingly it is possible to reduce transmission of the pulsation of the engine torque Te to the power transmitting system 10. It is also possible to reduce transmission of a temporary load due to an inertia moment of the engine 14, to the input shaft 18 during the operation of the torque limiter device 24.

Another embodiment of this invention will be described. In the following description, the same reference signs will be used to identify the common elements in the different embodiments, which will not be described.

Second Embodiment

Figure 6:
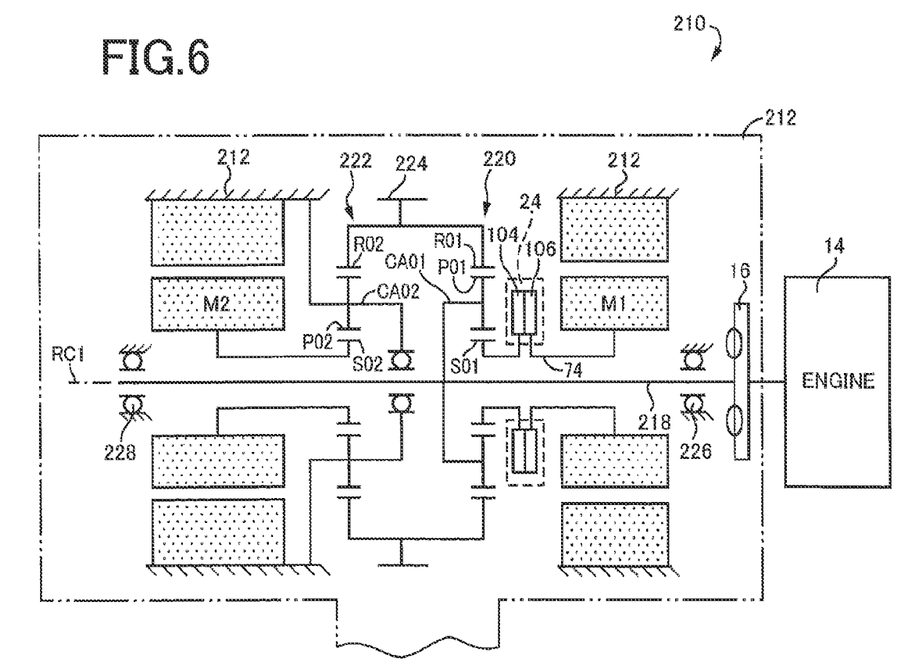
FIG. 6 is a schematic view for explaining a vehicular power transmitting system according to a second embodiment of this invention.

In the present second embodiment, the torque limiter device 24 is provided in a vehicular power transmitting system 210 which is different in construction from the power transmitting system 10 according to the first embodiment described above. FIG. 6 is the schematic view for explaining the vehicular power transmitting system 210 (hereinafter referred to as "power transmitting system 210") according to the second embodiment. As shown in FIG. 6, the power transmitting system 210 is a transaxle which is interposed between the engine 14 and the drive wheels 40 to transmit a drive force from the engine 14 to the drive wheels 40. The power transmitting system 210 has a transaxle (T/A) casing 212 (hereinafter referred to as "casing 212") as a non-rotatable member, and is provided with: the damper 16 operatively connected to the output shaft (crankshaft, for example) of the engine 14; an input shaft 218 rotated by the engine 14 through the damper 16; the first electric motor M1 corresponding to the electric motor according to the present invention; a first planetary gear set 220 functioning as a power distributing mechanism; a second planetary gear set 222 functioning as a speed reducing device; and a second electric motor M2 operatively connected to the drive wheels 40 which are disposed in the described order from a side of engine 14 (shown in FIG. 1).

The present power transmitting system 210 is preferably installed transversely in a front part of the vehicle 6 of a front-drive type, namely, of an FF (front-engine front-drive) type, to drive the drive wheels 40. In the power transmitting system 210, the drive force of the engine 14 is transmitted from an output gear 224 to the pair of drive wheels 40 successively through the differential gear device 36 connected to the output gear 224 through a plurality of gears, for example, and through the pair of axles 38.

The input shaft 218 is supported rotatably at its opposite ends by ball bearings 226 and 228, and is connected at one of its ends to the engine 14 through the damper 16 so that the input shaft 218 is rotated by the engine 14.

The first planetary gear set 220 is a differential mechanism connected between the engine 14 and the drive wheels 40. Described more specifically, the first planetary gear set 220 is a single-pinion type planetary gear device provided with rotary elements (elements) consisting of a first pinion gear P01; a first rotary element in the form of a first carrier CA01 supporting the first pinion gear P01 such that the first pinion gear P01 is rotatable about it axis and an axis of the first planetary gear set; a second rotary element in the form of a first sun gear S01; and a third rotary element in the form of a first ring gear R01 meshing with the first sun gear S01 through the first pinion gear P01. It will be understood that the first planetary gear set 220 corresponds to a planetary gear set according to the present invention.

The first planetary gear set 220 is a power distributing mechanism operable to mechanically distribute an output of the engine 14 transmitted to the input shaft 218, to the first electric motor M1 and the output gear 224. Namely, the first planetary gear set 220 is configured such that the first carrier CA01 is connected to the input shaft 218, that is, to the engine 14, and the first sun gear S01 is connected to the first electric motor M1 through the torque limiter device 24, while the first ring gear R01 is connected to the output gear 224. Since the first sun gear S01, first carrier CA01 and first ring gear R01 are rotatable relative to each other, the output of the engine 14 is distributed to the first electric motor M1 and the output gear 224, and the first electric motor M1 is operated as an electric generator by a portion of the output of the engine 14 distributed to the first electric motor M1. An electric energy thus generated by the first electric motor M1 is stored in an electric-energy storage device, or is used to operate the second electric motor M2. When the differential state of the first planetary gear set 220 is controlled by the first electric motor M1 while the power transmitting system 210 is placed in a continuously-variable shifting state (electric CVT state), the power transmitting system 210 functions as an electrically controlled continuously variable transmission in which the rotating speed of the output gear 224 is continuously variable irrespective of the specific operating speed of the engine 14.

The second planetary gear set 222 is a single-pinion type planetary gear device provided with rotary elements consisting of; a second sun gear S02; a second pinion gear P02; a second carrier CA02 supporting the second pinion gear P02 such that the second pinion gear P02 is rotatable about its axis and an axis of the second planetary gear set; and a second ring gear R02 meshing with the second sun gear S02 through the second pinion gear P02. It is noted that the first ring gear R01 of the first planetary gear set 220 and the second ring gear R02 of the second planetary gear set 222 are formed integrally with each other as a composite gear which has a radially outer portion functioning as the output gear 224.

In this second planetary gear set 222, the second carrier CA02 is fixed to the casing 212 and is thus prevented from being rotated, and the second sun gear S02 is connected to the second electric motor M2, while the second ring gear R02 is connected to the output gear 224. Namely, the second electric motor M2 is connected to the output gear 224 and the first ring gear R01 of the first planetary gear set 220 through the second planetary gear set 222. In this arrangement, the second sun gear S02 is rotated by a rotary motion of the second electric motor M2 to start the vehicle, for example, and the rotating speed of the second sun gear S02 is decelerated by the second planetary gear set 222 before the rotary motion of the second sun gear S02 is transmitted to the output gear 224.

The torque limiter device 24 is interposed between the first sun gear S01 of the first planetary gear set 220 and the first electric motor M1, as in the first embodiment, and the engine-side (sun-gear side) first rotary portion 104 is rotated together with the first sun gear S01 about the first axis RC1, while the second rotary element 106 on the side of the first electric motor M1 is rotated together with the first electric motor M1 about the first axis RC1. That is, the first rotary portion 104 is constituted by the friction plate member 92, while the second rotary portion 106 is constituted by the covering member 94, the pair of presser members 96, the coned-disc spring 98, and the retainer spring 100. The friction plate member 92 is connected, for instance, splined to the first sun gear S01 such that the friction plate member 92 is rotated together with the first sun gear S01, while the covering member 94 is connected, for instance, splined to the electric motor output shaft 74 of the first electric motor M1 such that the covering member 94 is rotated together with the electric motor output shaft 74.

The present second embodiment wherein the power transmitting path from the engine 14 to the first electric motor M1 has the same arrangement as in the first embodiment has the same advantages as the first embodiment.

While the embodiments of this invention have been described in detail by reference to the drawings, for illustrative purpose only, it is to be understood that the present invention may be embodied with various changes and improvements, which may occur to those skilled in the art.

In the illustrated first embodiment, for example, (i) the inertia moment $I_1$ of the first rotary portion 104 about its axis is smaller than the inertia moment $I_2$ of the second rotary portion 106 about its axis, and (ii) the total engine-side inertia moment $I_{T1}$ is smaller than the total electric-motor-side inertia moment $I_{T2}$. However, both of the above-indicated two conditions (i) and (ii) need not be satisfied, and the power transmitting system 10 may be configured to satisfy only one of the above-indicated two conditions (i) and (ii).

In the illustrated first embodiment, the planetary gear set 22 is interposed between the input shaft 18 and the torque limiter device 24. However, this positional relationship is not essential, and a plurality of planetary gear sets may be interposed between the input shaft 18 and the torque limiter device 24.

In the planetary gear set 22 according to the illustrated first embodiment, the carrier CA1 is connected to the input shaft 18, and the sun gear S1 is connected to the first electric motor M1 through the torque limiter device 24, while the ring gear R1 is connected to the first driving gear 20. However, this relationship of connection is not essential, as long as the input shaft 18, first electric motor M1 and first driving gear 20 are connected to selected respective ones of the three rotary elements CA1, S1 and R1 of the planetary gear set 22.

In the illustrated first embodiment, the input shaft 18 is connected to the engine 14 through the damper 16. However, the damper 16 may be eliminated, and the input shaft 18 may be connected to the engine 14 directly, or indirectly through a transmission belt or gears, for instance.

In the illustrated first embodiment, the first rotary portion 104 is constituted by the friction plate member 92 while the second rotary portion 106 is constituted by the covering member 94, pair of presser members 96, coned-disc spring 98 and retainer spring 100. However, the components of the first and second rotary elements 104, 106 are not limited to those in the first embodiment.

In the illustrated first embodiment, the pair of presser members 96 are disposed radially outwardly of the pinion gear P1 coaxial with the first axis RC1, as shown in FIG. 2. However, this radial positional relationship is not essential.

In the illustrated first embodiment, the torque limiter device 24 is a wet-type torque limiter disposed within the casing 12 in which the planetary gear set 22 is accommodated. However, the torque limiter device 24 may be a dry-type torque limiter disposed outside the casing 12.

In the illustrated first embodiment, a transmission is not provided in the power transmitting path between the first driving gear 20 and the drive wheels 40. However, a manual or automatic transmission may be disposed in the power transmitting path, in addition to the planetary gear set 22.

In the illustrated second embodiment, the power transmitting system 210 is provided with the first planetary gear set 220, second planetary gear set 222, and first electric motor M1. However, this configuration of the power transmitting system 210 is not essential. For instance, the power transmitting system 210 may be replaced by a power transmitting system for a so-called "parallel hybrid" vehicle, which is not provided with the first planetary gear set 220, second planetary gear set 222, and first electric motor M1, and in which the engine 14, a clutch, the input shaft 218, the second electric motor M2 and the drive wheels 40 are connected in series to each other. In the power transmitting system for this parallel hybrid vehicle, the second electric motor M2 corresponds to the electric motor according to the present invention, and the torque limiter device 24 is interposed between the input shaft 218 and the second electric motor M2. Where the present invention applies to the power transmitting system for the above-indicated parallel hybrid vehicle, the deterioration of durability of the input shaft 218 can be reduced, as in the illustrated second embodiment. Since the above-indicated clutch is provided as needed, between the engine 14 and the input shaft 218, the power transmitting system for the above-indicated parallel hybrid vehicle may not be provided with the clutch.

In the illustrated first embodiment, the engine 14 is connected to the input shaft 18 through the damper 16 such that the engine 14 and the input shaft 18 are rotatable about the common first axis RC1. However, the engine 14 and the input shaft 18 may not be disposed coaxially with each other on the same first axis RC1, and may be operatively connected to each other through a belt or gears, for example.

Although the planetary gear set 22 in the illustrated first embodiment is of a single-pinion type, the planetary gear set 22 may be replaced by a double-pinion planetary gear set.

While the power transmitting system 10 according to the illustrated first embodiment is not provided with a power disconnecting device such as a clutch disposed between the engine 14 and the planetary gear set 22, the power transmitting system 10 may be provided with the power disconnecting device between the engine 14 and the planetary gear set 22. Further, the above-indicated power disconnecting device may be provided between the first electric motor M1 and the second electric motor M2, between the first electric motor M1 and the planetary gear set 22, or between the second electric motor M2 and the second driving gear 30.

NOMENCLATURE OF REFERENCE SIGNS

10: Power transmitting system (Vehicular power transmitting system)
12: Casing (Housing)
14: Engine
16: Damper
18: Input shaft
22: Planetary gear set
24: Torque limiter device
40: Drive wheels
92: Friction plate member (Friction plate)
96: Presser members
102: Pressing mechanism
104: First rotary portion
106: Second rotary portion.
220: First planetary gear set (Planetary gear set)
M1: First electric motor (Electric motor)
RC1: First axis (Axis of rotation of the first and second rotary portions)
S1: Sun gear
P1: Pinion gear
CA1: Carrier
R1: Ring gear
S01: First sun gear (Sun gear)
P01: First pinion gear (Pinion gear)
CA01: First carrier (Carrier)
R01: First ring gear (Ring gear)

The invention claimed is:

1. A vehicular power transmitting system comprising an input shaft connected to an engine, an electric motor connected to a power transmitting path between said input shaft and drive wheels, a first rotary portion disposed on the side of said engine, and a second rotary portion disposed on the side of said electric motor, such that the input shaft, the electric motor, the first rotary portion and the second rotary portion are rotatable relative to each other about a predetermined axis of rotation, said first rotary portion and said second rotary portion providing a torque limiter device configured to limit a transmitting torque to be transmitted between said first and second rotary portions, to a predetermined upper limit, by a slipping motion between said first and second rotary portions, further comprising:
   a planetary gear set which constitutes a part of the power transmitting path between said input shaft and said drive wheels and which includes a sun gear connected to said electric motor through said torque limiter device, a ring gear connected to said drive wheels, and a carrier which is connected to said input shaft and which supports a pinion gear interposed between said sun gear and said ring gear, such that the pinion gear is rotatable about its axis and an axis of the planetary gear set, wherein
   an inertia moment of said first rotary portion about said predetermined axis of rotation is smaller than an inertia moment of said second rotary portion about the predetermined axis of rotation.

2. The vehicular power transmitting system according to claim 1, wherein a total engine-side inertia moment which is a sum of inertia moments of rotary members about their axis of rotation in the power transmitting path from said input shaft to said first rotary portion is smaller than a total electric-motor-side inertia moment which is a sum of inertia moments of rotary members about their axis of rotation in a power transmitting path from said electric motor to said second rotary portion.

3. A vehicular power transmitting system comprising an input shaft connected to an engine, an electric motor connected to a power transmitting path between said input shaft and drive wheels, a first rotary portion disposed on the side of said engine, and a second rotary portion disposed on the side of said electric motor, such that the input shaft, the electric motor, the first rotary portion and the second rotary portion are rotatable relative to each other about a predetermined axis of rotation, said first rotary portion and said second rotary portion providing a torque limiter device configured to limit a transmitting torque to be transmitted between said first and second rotary portions, to a predetermined upper limit, by a slipping motion between said first and second rotary portions, further comprising:

a planetary gear set which constitutes a part of the power transmitting path between said input shaft and said drive wheels and which includes a sun gear connected to said electric motor through said torque limiter device, a ring gear connected to said drive wheels, and a carrier which is connected to said input shaft and which supports a pinion gear interposed between said sun gear and said ring gear, such that the pinion gear is rotatable about its axis and an axis of the planetary gear set, wherein a total engine-side inertia moment which is a sum of inertia moments of rotary members about their axis of rotation in the power transmitting path from said input shaft to said first rotary portion is smaller than a total electric-motor-side inertia moment which is a sum of inertia moments of rotary members about their axis of rotation in a power transmitting path from said electric motor to said second rotary portion.

4. The vehicular power transmitting system according to claim 1, wherein said torque limiter device is disposed within a housing in which said planetary gear set is accommodated, and is lubricated with a lubricant which lubricates said planetary gear set.

5. The vehicular power transmitting system according to claim 2, wherein said torque limiter device is disposed within a housing in which said planetary gear set is accommodated, and is lubricated with a lubricant which lubricates said planetary gear set.

6. The vehicular power transmitting system according to claim 3, wherein said torque limiter device is disposed within a housing in which said planetary gear set is accommodated, and is lubricated with a lubricant which lubricates said planetary gear set.

7. The vehicular power transmitting system according to claim 1, wherein said first rotary portion includes a friction plate, while said second rotary portion includes a presser member frictionally contacting said friction plate, and a pressing mechanism configured to press said presser member against said friction plate.

8. The vehicular power transmitting system according to claim 2, wherein said first rotary portion includes a friction plate, while said second rotary portion includes a presser member frictionally contacting said friction plate, and a pressing mechanism configured to press said presser member against said friction plate.

9. The vehicular power transmitting system according to claim 3, wherein said first rotary portion includes a friction plate, while said second rotary portion includes a presser member frictionally contacting said friction plate, and a pressing mechanism configured to press said presser member against said friction plate.

10. The vehicular power transmitting system according to claim 1 wherein said first rotary portion includes a friction plate, while said second rotary portion includes a presser member frictionally contacting said friction plate, and a pressing mechanism configured to press said presser member against said friction plate, and said presser member is disposed radially outwardly of said pinion gear regarding a center axis of said planetary gear set.

11. The vehicular power transmitting system according to claim 2 wherein said first rotary portion includes a friction plate, while said second rotary portion includes a presser member frictionally contacting said friction plate, and a pressing mechanism configured to press said presser member against said friction plate, and said presser member is disposed radially outwardly of said pinion gear regarding a center axis of said planetary gear set.

12. The vehicular power transmitting system according to claim 3 wherein said first rotary portion includes a friction plate, while said second rotary portion includes a presser member frictionally contacting said friction plate, and a pressing mechanism configured to press said presser member against said friction plate, and said presser member is disposed radially outwardly of said pinion gear regarding a center axis of said planetary gear set.

13. The vehicular power transmitting system according to claim 1, further comprising a damper which is interposed between said engine and said input shaft, to transmit a torque from one of the engine and the input shaft to the other, and to absorb a pulsation of the torque.

14. The vehicular power transmitting system according to claim 2, further comprising a damper which is interposed between said engine and said input shaft, to transmit a torque from one of the engine and the input shaft to the other, and to absorb a pulsation of the torque.

15. The vehicular power transmitting system according to claim 3, further comprising a damper which is interposed between said engine and said input shaft, to transmit a torque from one of the engine and the input shaft to the other, and to absorb a pulsation of the torque.

* * * * *